United States Patent Office 3,256,141
Patented June 14, 1966

3,256,141
METHOD OF IMPROVING THE EFFICIENCY OF VACUUM AND FLOTATION TYPE WHITE WATER RECOVERY SYSTEMS USING AN ACRYLAMIDE TERPOLYMER
William M. Stephenson, Park Forest, Ill., assignor to Nalco Chemical Company, Chicago, Ill., a corporation of Delaware
No Drawing. Filed Oct. 27, 1964, Ser. No. 406,868
6 Claims. (Cl. 162—190)

This application is a continuation-in-part of copending application Serial No. 205,879 filed June 28, 1962, now abandoned.

This invention relates to a method for improving the operational efficiency of white water recovery systems of the type commonly found in the manufacture of fibrous products such as paper. Particularly the invention is directed to an improved method for increasing the operational efficiency of white water flotation type saveall systems through addition of specific water-soluble terpolymeric compounds.

Paper manufacturers are continually trying to discover better methods for efficiently handling the processing and disposal of white waters. White waters, for purposes of this invention, are any aqueous suspensions of solid materials which remain after the processing of the greater part of fibrous and non-fibrous materials in the aqueous suspension to form a sheet or mat-like structure. In a standard papermaking operation, a typical furnish contains from 0.1 to 6.0% by weight of pulp as well as other dispersed or suspended ingredients such as, for instance, inorganic fillers and size such as rosin, glue, flour and the like. This aqueous slurry is passed onto a Fourdrinier wire or cylinder wire mold which retains the majority of the suspended fibrous materials and other chemicals, with much of the excess of the water used to suspend the pulp being allowed to drain through the wire where it is collected by various types of apparatus which are commonly referred to in the paper manufacturing trade as saveall systems.

The drainage entering the saveall systems will be composed substantially of water but will contain from 0.005 to 0.1% by weight of various types of organic and inorganic substances which were used in the furnish or make-up of the initial pulp slurry. This water suspension of finely divided solids in the saveall system is known as white water. The finely divided solids contained in the saveall should be collected and returned to the paper processing stream if efficient utilization of the various materials contained therein is to be achieved.

In the past, it has been common to dispose of white waters from the paper manufacturing process by discharging them into streams or sewage systems where they would ultimately find their way into various types of natural bodies of water. As paper production was increased, it was soon discovered that white waters tended to be a contaminating factor. They provided a source of both organic and inorganic pollution of the water, and they tended to increase the B.O.D. (Biological Oxygen Demand) of these natural water bodies to the extent that they became unsuitable for use as sources of potable water. This contamination also tended to destroy the marine life which often flourished in these waters.

With the development of the paper industry numerous attempts were made to improve white water recovery systems. Great advances have been made in the types and designs of white water recovery systems. As a general rule, there are three basic types of white water recovery systems. First, but perhaps the least efficient, is the settling type system in which the white waters are fed into a reservoir or settling basin where the suspended solids are allowed to gradually sink to the bottom of the basin. After a period of time has elapsed substantial settling occurs. The water is then withdrawn for either re-use or is discharged to appropriate waste disposal systems. The settled material is removed by either scraping or cleaning operations. This system not only requires large expensive equipment units, but is extremely inefficient from the viewpoint of processing time, maintenance, and labor requirements for operation. For the most part, settling type systems have been replaced by newer more efficient systems and are only used to a very limited extent.

The newer type of saveall units may be generally classified as either vacuum type systems or flotation type systems. The vacuum type system operates on a simple principle. In this system a wire rotary drum having a plurality of foramen is employed and the paper stock as it passes over the wire drum is subjected to a vacuum which deposits the fibers on the wire with the water being passed through for re-use or disposal. In this type of system, the suspended solids of the system are collected on the drum wire and are then removed by scraping, dumping, or the like. Usually a breaker roll is used to contact the wire drum whereupon the vacuum is broken and the fibrous mat is transferred to the roll and subsequently re-used or discarded. The major disadvantage of the vacuum type system is that it is only practical where the drainage characteristics of the suspended solids in the white water produce a mat upon the vacuum drum that is relatively non-compact and allows good drainage to occur. For this reason, the vacuum type systems are not particularly suited for use in many types of papermaking operations and are therefore somewhat limited.

In recent years, great strides have been made in flotation type white water processing systems. The principle upon which the flotation saveall systems operate is that of continuously dissolving air under pressure into a collected quantity of white water. This produces a flotatable mass consisting of fiber and other undissolved components which separate from the furnish used in the particular paper process. After the air has been dissolved under pressure into the white water, the compressed white water is then released to the atmosphere or to a reduced pressure system, usually by passage into a separate container. As a result, air bubbles are formed which carry the fiber and other suspended materials to the surface of the collecting container. After being carried to the surface of the container, the suspended materials which are frequently in the form of a frothy or foamy mass, are then skimmed by means of suitable mechanical skimmers and are then either returned for reprocessing or are discharged to waste.

While the flotation type saveall systems have proved themselves to be the most efficient from both the standpoint of equipment investment as well as operational efficiency, it has been observed that these systems are not entirely satisfactory. Although careful operational control of these systems will enable a fairly adequate treatment of white water, it has been found necessary to employ various types of chemicals in conjunction with their use. Chemicals not only improve their efficiency but also simplify the operation of these units.

In summary, it might be said that the function and primary purpose of various types of saveall systems is to save additional fiber and other suspended materials contained in the white water. Another important benefit derived from the use of saveall equipment is to improve the clarity of the treated white water by removing suspended solids thereby enabling it to be re-used in various mill operations where a relatively high quality of water is required. Another purpose of efficient saveall operation is to decrease pollution loads to streams and other natural bodies of water. A further important aspect of efficient saveall operation is to decrease the number of man-hours needed to operate and maintain equipment. When chemicals are used in conjunction with saveall systems it is beneficial that they be used at a low economical dosage and that they tend to generally upgrade the efficiency of the plant in which they are employed.

The most commonly used chemicals in the treatment of white waters to improve the operational efficiency of saveall units are naturally occurring polymeric proteins such as various types of animal glues. Glue is said to promote the agglomeration of suspended solids in the saveall system and thereby increase the yield of suspended matter that is removed or acted upon by the system. Glue, however, has several drawbacks which makes its use in saveall systems not entirely satisfactory. Animal glues tend to support microbiological growth which forms slime masses in saveall systems and substantially interferes with their operation. In another aspect, glue is not satisfactory since it must be used under rather critical pH conditions for its most efficient employment. Also, glue is not entirely satisfactory since it is difficult to make up treating solutions and they must be used within a relatively short period of time after being made up since age tends to destroy their usefulness. Lastly, for efficient operation, relatively gross amounts of glue must be used.

In addition to using glue, other chemicals have been suggested for improving the efficiency of saveall operations. These chemicals may be illustrated by such materials as activated silica, alum, sodium aluminate, and the like. Quite frequently such factors as pH, dissolved solids, retention time in the system, flow rate and the nature of the suspended solids will act to negate or substantially lessen the effectiveness of these prior art additives.

Another problem that is sometimes encountered in the use of various types of saveall systems and, in particular, flotation type saveall systems, is that while the unit is capable of removing the fibrous matter contained in the white water it is not effective in collecting various types of fillers, size ingredients, and the like which are intimately admixed with the fibers during the paper manufacturing process.

It is particularly difficult to find chemicals which may be useful as efficient flotation type saveall additives. More specifically, there are no guide lines to help one in predicting which class of chemicals may be active flotation aids, since it has been determined that a chemical useful in some seemingly analogous water treatment process or as an aqueous paper pulp beneficiator may be completely inactive as a flotation additive. That is, broadly speaking, chemicals employed in what are seemingly related water treating processes cannot necessarily be interchanged from one function to another. As just one example, many chemicals disclosed as useful coagulant or settling agents or clarification aids are often completely ineffectual as a flotation additive in white water systems. Thus, specific chemicals must be tailored to meet the various needs of efficient saveall recovery systems.

With the several problems enumerated above, it is evident that improvement is needed in the operation of saveall systems, particularly those of the vacuum or flotation type. It is further obvious that when such systems are utilized in conjunction with various chemical additives in an attempt to improve their efficiency, that the chemical additives are often not entirely satisfactory. It, therefore, becomes an object of the invention to provide a method for improving the operational efficiency of vacuum and flotation type saveall systems of the type used in treating white waters resulting from the manufacture of paper and similar fibrous substances.

Another object is to provide chemical means which are capable of improving the operational characteristics of several types of saveall systems commonly employed in the treatment of white water in paper manufacturing operations.

An important object of the invention is to provide chemical means for the treatment of saveall systems, which are not greatly affected by pH, type of suspended solids, and other environmental conditions of the white water, and yet which will efficiently improve the recovery of suspended fibrous and other matter in white waters as well as produce a high quality, clear effluent water which may be subsequently re-used in various stages of the paper manufacturing process.

A further object is to provide chemical means for use in conjunction with saveall units in the manufacture of paper which will not interfere with their mechanical functioning.

Still another object is to provide chemical means which will not only improve the general overall efficiency of saveall operations, but which will increase the throughput in a particular system and at the same time increase both the recovery of fines and suspended matter as well as producing a high quality water therein.

A specific object of the invention is to provide a system for processing white water with high molecular weight terpolymeric substances which have excellent activity in increasing operational efficiency of saveall units, but yet possess the requisite water solubility to be fed into these systems as solid material or as dilute aqueous solutions and are still thereby immediately available as a dispersed saveall additive.

Other objects will appear hereinafter.

In accordance with the invention it has been found that the operational efficiency of vacuum saveall and flotation type white water recovery systems may be substantially improved by treating the white water with a very small, yet beneficial, amount of a high molecular weight water-soluble terpolymer.

These terpolymeric compositions comprising in chemical combination, polyacrylamide, a polymerized polycarboxylic acid, the monomer of which is either maleic acid, maleic anhydride or fumaric acid and a polymerized ethylenically unsaturated water-soluble monomer, show excellent saveall activity even in addition levels as low as 0.01 p.p.m. based on the weight of white water influent. The terpolymers of the invention have unusually good water-solubility, notwithstanding the high molecular weights of the products, and may be used as saveall aids in all types of vacuum or flotation type systems.

As broadly outlined above, the terpolymers of the invention comprise three groups of monomers which are polymerized in the presence of each other in a single step process to give a terpolymer with the type and amount of recurring units and their respective polar groupings being dependent upon the amount of each monomer employed. The exact molecular configuration, of course, cannot be determined, but is rather considered a statistical average according to the ratio of the monomers employed one to the other with their respective side-groups. Extremely high molecular weights and the desired physical characteristic of free-flowing white powder are obtained through a special polymerization technique which will be discussed in more detail hereinafter. The high molecular weight terpolymers of the invention are achieved without sacrifice of water solubility necessary in saveall work.

The first essential monomeric starting reactant is acrylamide. This monomer is easily obtained by well-known commercial processes such as partial hydrolysis of acrylonitrile. It has been determined that the amount of acrylamide which shall be employed to give desired saveall recovery results is 85–95 parts by weight.

The most preferred range of acrylamide used is 89.5 to 94.5 parts by weight. Terpolymers synthesized by use of acrylamide in the above recited ranges in specific combination with the other two monomeric substances in weight ranges, which will be discussed further, have exceptional ability in enhancing the efficiency of the particular saveall unit employed. Thus, through effective saveall recovery, increased amounts of suspended solids recovery is achieved, and the residual white water which remains after saveall processing may be re-used in the paper process without deleterious amounts of suspended impurities.

The next monomeric starting material is a polymerizable polycarboxylic acid which may be chosen from maleic acid, maleic anhydride, or fumaric acid. Again, the amounts of starting polycarboxylic acid monomer used is important. Excellent saveall activity is achieved when from 0.3 to 2.0 parts by weight of the above compounds such as maleic anhydride is employed. The most preferred saveall additives comprise those including from 0.5 to 1.5 parts by weight of the polycarboxylic acid monomer. Due to low cost and availability, the most preferred of the above three materials is maleic anhydride.

The last monomeric reactant to be discussed is a water-soluble ethylenically unsaturated monomer differing from any of the above monomers and containing polar groups; examples of such monomers are acrylic acid and salts and alkyl esters thereof, vinyl pyrrolidone, vinyl acetate, methacrylamide, vinyl alkyl ethers such as methyl vinyl ether, methacrylic acid and salts and alkyl esters thereof, acrylonitrile, vinyl alcohol, methacrylonitrile, allyl alcohol, allyl amine, etc. By use of the term "water-soluble" it is intended to include not only those substances which are soluble in all proportions with water, but also to include monomers which may have low solubility, but nevertheless may be dispersed or emulsified in water by suitable techniques. The amount of ethylenically unsaturated monomer employed as a starting material should vary from about three to about fifteen parts by weight. Best results with regard to saveall activity and desired physical characteristic of free flowing powder is reached when from five to nine parts by weight of ethylenically unsaturated monomer is employed.

The terpolymers of the invention then, include the following polymeric reactants and their range of starting material weights.

COMPOSITION A

| Monomer: | Parts by weight |
|---|---|
| Acrylamide | 85.0–95.0 |
| Polycarboxylic acid monomer | 0.3–2.0 |
| Ethylenically unsaturated water-soluble monomer | 3.0–15.0 |

Composition B shows the more preferred general terpolymers of the invention and their respective weight ranges.

COMPOSITION B

| Monomer: | Parts by weight |
|---|---|
| Acrylamide | 89.5–94.5 |
| Polycarboxylic acid monomer | 0.5–1.5 |
| Ethylenically unsaturated water-soluble monomer | 5.0–9.0 |

The most preferred specific terpolymer of the invention having the range of reactant weights as outlined in Composition B above includes polyacrylamide, maleic anhydride and methacrylic acid.

In order to produce terpolymers of exceedingly high molecular weight, and correspondingly proportional excellent saveall ability, a special polymerization technique was employed. Broadly speaking, this technique involved preparation of the highly concentrated monomer solution, addition of an inert heat transfer solvent media, which may be referred to as an organic solvent, and subsequent polymerization effected at relatively low temperatures. The polymerization must be carried out under conditions of high agitation and in the presence of an anti-sticking agent, which acts to keep the formed polymer from agglomerating into an impractical and unusable mass. If conditions are followed closely, granules of relatively small size may be obtained which are easily ground into a free-flowing white soluble powder, and are immediately ready for use without further processing. The monomers actually terpolymerize in a separate stratum within the above system in the presence of a surface active compound acting as the anti-sticking agent.

More specifically, an aqueous solution is prepared containing about 30% to about 80% by weight of monomers, 20% to 70% water, and 0.003% to about 0.2% based on the weight of monomer present of a polymerization catalyst, such as potassium persulfate. The water solution is then added to or mixed with a water-insoluble, organic, heat transfer medium which preferably is capable of forming an azeotropic mixture with water. The above mixture should contain a minor amount of a surface active agent which prevents the terpolymer from sticking to the agitator or the walls of the vessel. The temperature of the system is raised to a desired point and the mixture is kept in motion by means of an agitator. Oxygen is removed from the system either by purging with an inert gas such as nitrogen or carbon dioxide, by applying a vacuum or by boiling the mixture. The polymerization is initiated as soon as the oxygen is removed. If an emulsion is formed due to the presence of the surface active agent, the emulsion breaks and the polymerization is carried out in a separate layer. The organic heat transfer medium substantially surrounds the aqueous medium as the polymerization takes place. Vigorous agitation is employed to continuously shear the polymer layer into particles which vary in diameter, for example, from about 1/16" to about 2" and more often from about 1/4" to 1/2". In a preferred process, the temperature of the mixture is raised to its boiling point or maintained at the boiling point in the event polymerization was carried out at the boiling point of the mixture and after the polymerization is completed, water is removed by azeotropic distillation. The boiling temperature, of course, varies in accordance with the particular organic heat transfer agent in the mixture.

During the boiling off stage, the organic solvent preferably is condensed and returned to the mixture while the water is being trapped and removed. After from 60 to 100% of the water has been eliminated the granules that have formed are separated from the solvent by filtration and are then washed and air dried.

It has been found that benzene, toluene, xylene, and methylene dichloride are especially suitable for use in the present process as well as carbon tetrachloride, tetrachloroethylene, and the like. Other comparable organic compounds that form azeotropic mixtures of water, however, could be used without difficulty as long as they do not contain alcohol, aldehyde or ketone groups which would cause undesirable side reactions. The polymerization medium can also contain a non-azeotroping component with boiling point above the distilling temperature. The above materials may be termed organic solvents and are all water-insoluble, organic heat exchange materials which are considered inert in the practice of the invention. These organic substances serve as heat transfer media or heat dissipators by suspension of the aqueous monomer phase and subsequently formed terpolymeric product.

The catalysts that are employed in the process include conventional peroxidic oxidizing agents such as potassium persulfate, hydrogen peroxide, and ammonium persulfate. It is preferred that water-soluble compounds be used for this purpose. The amount of catalyst used in the process can vary from 0.003% to about 0.2% by weight based on the weight of the monomers. A preferred range is from about 0.003% to about 0.05%. Catalyst concentrations above 0.2% will polymerize the aqueous solution containing the three monomers, but the resultant products are inferior to those prepared using amounts of catalyst within the specified ranges. One of the advantages of the subject process, therefore, is that it provides a means of carrying out the polymerization using very small amounts of catalyst.

As was pointed out above, a surface active agent should be added to the polymerization mixture in order to prevent the polymer from sticking to the walls of the reaction vessel and to the agitator. There are numerous compounds on the market which would perform satisfactorily in the capacity. Materials such as "Ethomid" S-15, O-15, and HT-15, which are ethylene oxide condensates of fatty acid amides, as well as "Arlacel 80" and "Span 80," which are sorbitan mono oleates, will serve adequately as anti-sticking agents as will sorbitan monostearate, sodium dodecyl benzene sulfonate, aluminum stearates, and aluminum oleates. A particularly preferred surface active anti-sticking agent is petroleum sulfonate. Initially in the process, the presence of the surface active agent may cause the formation of an emulsion. It is essential, however, that the emulsion break and form two separate and distinct layers prior to the polymerization reaction. The amount of surface active agent which is added to the system can vary from about 0.5% to about 7% by weight based on the weight of the heat transfer medium, and preferably will vary from about 2% to about 4% by weight. During the polymerization, the monomer-containing aqueous medium is substantially surrounded by the organic heat transfer medium.

In a preferred embodiment, the polymerization reaction is carried out using a redox type catalytic system. In the method described above, either avoiding or removal of oxygen by other means is needed to permit the catalyst to form free radicals. In a redox system, the catalyst is activated by means of a reducing agent, which in the absense of oxygen immediately produces free radicals without the use of heat. One of the reducing agents most commonly used is sodium metabisulfite. Other suitable agents include water-soluble thiosulfates, bisulfites, hydrosulfites, and reducing salts, such as the sulfates of metals which are capable of existing in more than one valence state. The metals include cobalt, iron, nickel, and copper. The use of a redox initiator system has several advantages, the most important of which is that it is possible to carry out the polymerization at lower temperatures. It is not required to decompose the catalyst.

As has been pointed out, a great many surface active agents can be used in the terpolymerization process. Those compounds mentioned above are illustrative of suitable and readily available products. The amount of surface active agent used in the process can vary from about .5 to 7%, and preferably 2% to 4% by weight of the heat transfer medium. Too large a quantity of the surface active agent should be avoided inasmuch as an excess might tend to form stable emulsions or suspensions. The surface active agents function primarily to prevent the forming terpolymer from sticking to either the agitator or walls of the reaction vessel.

The selection of particular catalysts—or activators, should a redox system be employed—for use in the process does not fall within the scope of our invention. Conventional catalysts such as potassium persulfate, and conventional activators, such as sodium metabisulfite, work very satisfactorily. It is important, however, that the amount of catalyst used in the process vary from 0.003% to about 0.2%, based on the weight of the monomers.

It is preferred to dissolve the catalyst and the activator in separate water solutions prior to adding to the aqueous solutions of the three monomers. The catalyst and activator can be dissolved in the aqueous monomeric solution just prior to adding the solution to the organic heat transfer agent. Alternatively, the catalyst can be dissolved in a small amount of water and then be added to the organic heat transfer medium prior to the addition of the monomeric solution. Another satisfactory method would be to dissolve the catalyst and/or activator in water and add this solution to the reaction mixture after the monomeric solution has been added to the heat transfer medium.

The water content of the terpolymers that are produced by the above method should range from 0 to about 28%. Our preferred water content range is from about 5% to about 15%. If the moisture content of the polymer is greater than about 28%, the granules tend to agglomerate.

Several organic relatively water-insoluble heat transfer liquids have been suggested above which can be used in the subject process. It is preferred that those liquids form azeotropic mixtures with water. By azeotropic mixtures, we mean mixtures which on heating will cause water to distill over at temperatures below the normal boiling point of the water at a given pressure. The use of an azeotropic mixture makes it possible to remove water from the terpolymer particles without employing special drying equipment. Apart from the fact that these liquids must not contain reactive groups such as alcohol, aldehyde, and ketone groups, which would cause side reactions, the selection of the particular heat transfer medium is not particularly critical. Benzene and toluene are relatively inexpensive components and they have been found to provide excellent results. For this reason, they are our preferred heat transfer materials.

As was pointed out above, the heat transfer medium plays an important part in the concentrated solution polymerization method. In particular, the function of the organic liquid is to remove the heat of reaction from the forming polymer.

One of the important steps of the polymerization process involves the removal of dissolved oxygen gas from the reaction mixture. The removal of the oxygen can be accomplished by (1) purging the reaction mixture with an inert gas such as nitrogen or carbon dioxide, (2) boiling the reaction mixture, and (3) applying a partial vacuum to the system. If an inert gas is used to remove the oxygent, it is best applied by passing the gas through a disperser or sparger which is inserted beneath the surface of the reaction mixture.

One of the major disadvantages of the prior art methods is that only dilute solutions of monomers could be polymerized without causing a violent reaction or without producing a rubbery, non-flowable material. In the subject process, the total monomer content of the aqueous solution can range from about 30% to about 80% by weight. Primarily because it is possible to work with concentrated solutions of monomer, the formed terpolymers have unusual and highly advantageous properties.

The following examples illustrate preferred terpolymers and their method of preparation.

Example I

This example illustrates a typical terpolymer involving terpolymerization of maleic anhydride, methacrylic acid and acrylamide using a redox system of polymerization and a high concentration of monomers via the polymerization technique as described above. Unless otherwise indicated, the percentage figures below are to be taken as percent by weight.

To 108.0 grams of water (12.6%) are added 1.125 grams of maleic anhydride (0.13%), 9.4 grams of methacrylic acid (1.11%), and 10.0 grams of a 50% concentrated aqueous solution of sodium hydroxide (1.17%). The above ingredients are mixed until complete solubilization is effected. 124.425 grams of acrylamide (14.59%) are added to the above mixture and the entire solution was gently agitated and mildly heated at a temperature not greater than 38° C. It is essential that the temperature not exceed above figure since heating at a higher temperature would effect polymerization prematurely. The pH of the solution is then adjusted with 50% caustic sufficient to raise the pH to 9.0.

In a separate 1000 ml. three-necked flask, equipped with thermometer, Dean and Stark trap, condenser, stirring device and heating mantle attached to a variable transformer are added 754.0 grams of toluene (67.32%) and 19.6 grams of "Arlacel 80" anti-sticking agent (2.30%). The reaction flask then is purged with nitrogen at a rate of 960 cc./min. After the inert solvent and anti-sticking agent mixture is purged sufficiently, the above basic monomeric solution is added to the 1000 cc. reaction flask. The system is put under reduced vacuum (8 inches of mercury) and heated to 70° C. After this temperature is reached, the vacuum is shut off and 4.8 grams of a 1% aqueous solution of $Na_2S_2O_5$ is added (0.56%) while the stirring mechanism is running. After a few seconds, 1.2 grams of a 1% aqueous solution of $K_2S_2O_8$ (0.14%) is added. During this addition of redox reagent, the reaction temperature drops two to three degrees C. The redox catalyst is completely added, the vacuum is reestablished at an 8″ reading, and the reaction mass reheated to 70° C. When this temperature is again reached the vacuum is shut off and only nitrogen is introduced into the reaction mixture for the duration of the reaction time. Heating is applied in order to maintain the reaction mass at 70° C. until an exotherm occurs. At this time, heat is discontinued and the temperature drops of its own accord to 68° C. After the exothermic reaction has been completed, temperature of the mixture of the polymerization reaction is maintained at about 70° C. for 50–60 minutes. At this time, water is then removed as an azeotropic distillate. Approximately 90% of the total water added was azeotroped off. Filtration from the organic solvent left a white granular product.

*Example II*

This example was run similar to the procedure outlined in Example I. To a 500 ml. beaker were added 85.5 grams acrylamide, 4.0 grams of methacrylic acid, 0.5 gram of maleic anhydride, and 72 mls. of distilled water. The monomeric solution was stirred and the pH was adjusted from 3.2 to 6.3 with 50% concentrated sodium hydroxide. With gentle stirring 0.8 ml. of a 1% aqueous solution of $K_2S_2O_8$ and 3.2 mls. of a 1% aqueous solution of $Na_2S_2O_5$ were added to the above monomeric solution. In a separate 1000 ml. reaction flask the inert organic solution containing the heat transfer media and anti-sticking agent were prepared. This solvent solution contained 574 grams of toluene and 19.6 grams of Arlacel 80. After heating the inert solvent solution to 71° C. with stirring, the monomeric aqueous solution was added slowly to the reaction flask. The temperature during the addition then dropped to 55° C. whereupon the entire mixture was reheated to 75° C. At this time, a 8″ vacuum was applied and a nitrogen layer was put over the reaction surface. The temperature was maintained at 75° C. for 26 minutes, after which time a phase separation was noted. During this time, a vacuum was continuously applied and nitrogen flowed over the surface. After the temperature had dropped to about 74° C. the polymerization was considered complete and then the water was removed by azeotropic distillation. 72 mls. of water was removed by this method. The resultant white free-flowing granules were washed and separated by vacuum filtration. These granules could be easily ground to below 40 mesh.

*Example III*

This example was again run using the general technique outlined in Example I. with minor variations in the amounts and ratios of the monomers within the recited limits of the invention and variations in heat transfer media, and anti-sticking agent.

Again, the aqueous monomeric system was formulated by adding 1.12 grams of maleic anhydride, 9.45 grams of methacrylic acid, and 124.43 grams of acrylamide to 110 mls. of distilled water. The pH was adjusted in this experiment to 9.0 with 50% concentrated sodium hydroxide. In a separate reaction flask, the organic inert solvent system was prepared by adding 0.62 gram of "Arlacel 80" to 683 mls. of toluene. The monomeric aqueous solution was added to the solvent system with stirring, nitrogen continuously run through the system, and vacuum applied to give 22 p.s.i. of actual pressure. Heat was then applied and the temperature raised to 60° C. Heat was momentarily removed, the vacuum was broken and 2.4 mls. of 1% aqueous solution of $Na_2S_2O_5$ solution and 0.6 ml. of a 1% aqueous $K_2S_2O_8$ solution previously diluted to 10 mls., were added to the reaction mixture. The vacuum system was resealed and the temperature adjusted to 60° C. After the temperature was reached, the vacuum was broken slowly over a period of about 30 seconds. Then the temperature of the reaction was held between 59° C. and 61.5° C. The exothermic reaction occurred ten minutes after addition of the catalyst and redox activator. In this run, the duration of the exothermic reaction was 41 minutes. After this time elapsed, 111 mls. of water were distilled off by azeotropic distillation and the final solid white product was separated from the organic heat transfer medium by filtration.

*Example IV*

In this example, fumaric acid was substituted for maleic anhydride employed in the previous examples.

1.12 grams of fumaric acid, 9.45 grams of methacrylic acid, and 124.43 grams of acrylamide were dissolved in 110 mls. of distilled water and the pH then adjusted to 9.0 with 50% concentrated aqueous sodium hydroxide solution. The organic solvent system was prepared by adding 0.62 gram of "Arlacel 80" to 630 mls. of toluene. The monomeric solution was added to the organic solvent system, with stirring, the reaction flask sealed, and nitrogen introduced for a few seconds through a nitrogen disperser. The vacuum was then applied (22 p.s.i. actual pressure), and heat applied until the temperature reached 70° C. The heating mantle was removed temporarily, the vacuum system broken, and 4.8 mls. of 1% $K_2S_2O_8$, previously diluted to 10 mls. of distilled water, were added. The system was resealed and the temperature adjusted to 70° C., after which time, the vacuum was broken slowly over a period of 30 seconds.

The temperature of the reaction was held between 69° C. and 71.5° C. Twelve minutes after the introduction of the catalyst and redox activator, a phase separation occurred and the exothermic reaction began. This reaction lasted for a total of 18 minutes. After the reaction was completed, 110 mls. of water were distilled off by azeotropic distillation. The solid white terpolymeric product was isolated by filtration.

To more fully demonstrate the numerous advantages gained in employing the terpolymers of the invention as chemical saveall additives, the following field tests are presented.

*Example V*

The test site was a Great Lakes area box board mill. The particular paper process flotation saveall study involved a Sveen-Pedersen Saveall. The water source of this saveall was a combination of top liner, underliner, filler and bottom liner white waters from a cylinder paper machine. During normal operation of the mill, the influent solids to the saveall generally varied from 5 to 7 pounds per 1000 gallons. The prior art material employed in the saveall was glue which attained a maximum of 65% efficiency when applied at a dosage of 6–10 p.p.m. The floc layer formed through the use of this chemical generally averages about ¼ inch.

One of the terpolymers of the invention, which had been synthesized using 92.17% acrylamide, 7.0% methacrylic acid, and 0.83% maleic anhydride as reactants, according to the general polymerization technique outlined in Example I, was then employed as a basis of comparison with glue. Using only a dosage of 0.8–1 p.p.m. of this terpolymer, the efficiency of the saveall operation was increased to about 90%. Also, the floc layer on top of the unit became very dense and tightly packed and existed to a depth of about ⅞ inch. Lower dosages were also employed ranging from 0.2–0.5 p.p.m.

and these also gave a suitable floc of about ¾ inch although this floc was not as dense and tightly packed as the above. Both the glue and terpolymer in this comparison were fed to the chemical add box and then injected into the distribution rings after air injection.

As can be readily seen in the above comparative example, the terpolymers gave substantially better efficiency. That is, a clear reduction of solids of the Sveen Saveall effluent was obtained in comparison to the performance of the prior art glue material. Also, the formed floc was denser, more extensive, and more readily removed when the terpolymer additive was employed, thereby promoting equipment operational efficiency. Moreover, the dosage levels of glue ranged from 8 to 10 times greater than the terpolymer of the invention. Even at this dosage level glue could not approach the efficiency of the terpolymeric composition in giving comparative results.

*Example VI*

Another field test was run at a 100% semi-chemical paper mill located in the Northwest region of the United States. The particular stock employed in the paper mill process was unbleached furnish which was used to produce a corrugated medium sheet. Again, a comparison was made with glue.

The saveall used in this particular mill was a flotation type unit which is known to the trade as a Krofta Floatator. Roughly, a 60% efficiency was obtained by using 7 p.p.m. of glue solution. A 5 hour test was then set up to determine the efficiency of the same terpolymer employed in Example I. This compound was fed as a 1% aqueous solution into the white water influent to the Floatator or to the Floatator itself.

By employing approximately 1 p.p.m. of this terpolymer, vastly improved results were noted when compared to glue at the above dosage. On an average the terpolymer efficiency was about 75% at this additive level in a 7 hour run. In addition to reducing the solids of the floatator, it was also noted that the floated stock on top of the unit was much more compact and readily removed than when the unit had been previously in operation with glue.

A specific test has been developed in order to evaluate possible saveall additives. The test conditions have been found to efficiently duplicate actual environment of an industrial paper mill saveall recovery system. More specifically, the test procedure used to evaluate possible saveall additives is carried out as follows.

A bleached sulfite fiber suspended in water was beaten to a 50 seconds Williams pulp fineness. 10% by weight of titanium dioxide and 2% by weight of alum, each based on fiber weight, were added to give a fiber-filler suspension of approximately 0.2% by weight of solids. This slurry was further diluted to 0.05% and the suspended solids slurry was then introduced into a pressure apparatus. The chemical additives under test, in amounts as desired, and generally in terms of pounds per ton of pulp, were also introduced in the apparatus, and 40 lbs. of pressure were put over the treated effluent material. The pressure apparatus was shaken and allowed to stand for one minute. The discharge valve of the pressure apparatus was connected to an open tube, the pressure apparatus was opened and the effluent discharged along with air bubbles into the opened tube. Solid material floated to the top and the subnatant water from the bottom tube was tested for its degree of turbidity after five minutes standing period. Turbidities of the subnatant samples were tested by placing these liquids in a Phototester unit which measured the light absorption. The lower the sample turbidity, as measured by percent of light absorption, the greater the degree of separation of floated solids from clarified subnatant liquid and the higher degree of efficiency, therefore, of the chemical additive used to aid flotation. As a basis of comparison, a blank was also run in each series of tests wherein no chemical flotation aid was added. Turbidity data realized from measurement of the subnatant liquid from the blank run was used as the base point of comparison. The blank sample was also measured for turbidity after the same five minutes standing period as were the subnatant samples from the chemically treated pulp effluent. A passable saveall flotation additive generally has a Phototester value of approximately at least 20 units lower than the blank sample.

As mentioned above, it has been determined that the monomer proportions of the chemicals used to make up the terpolymeric substances of the invention are important, and terpolymers prepared from monomers in ratios outside the discovered ranges show surprisingly less efficiency as saveall flotation aids.

More specifically, a number of terpolymeric substances were synthesized in which the monomer ratios were deliberately varied outside the scope of the invention. In each case, saveall activities of the produced polymeric chemical aids were substantially lower and non-acceptable. The following examples illustrate a few of these preparations wherein terpolymers falling without the scope of the invention were produced.

*Example VII*

This example was run similar to the procedure outlined in Example I, with the exception that the monomer ratio was varied outside the scope of the invention. Specifically, a polymerizable solution was prepared containing 0.11% of maleic anhydride, 0.89% methacrylic acid and 99.0% of acrylamide, the above percentages being based solely on total monomer content. These monomers were terpolymerized and the final product tested for saveall activity in accordance with the test procedure just noted above. At a dosage of 3.25 p.p.m., this product had a Phototester No. of 55. A blank sample, on the other hand, had a Phototester No. of 58. This particular product, therefore, was considered commercially sub-standard in terms of acceptable saveall recovery promotion, and in fact was little better than the blank test run in complete absence of chemical.

*Example VIII*

Like the above example, the monomer ratio of the three monomers was again deliberately adjusted outside the claimed range. In this case, 6.0% of maleic anhydride, 4.0% of methacrylic acid and 90% of acrylamide monomers were terpolymerized and the product again tested for saveall activity. This particular terpolymer exhibited a Phototester unit number of 45 when employed at a 3.25 p.p.m. dosage in the saveall test described above. The blank exhibited a Phototester No. of 58. Again, the terpolymeric product was non-acceptable in terms of an efficient saveall aid measured by commercial standards.

*Example IX*

The product of Example I, a typical terpolymer falling within the scope of the invention, was also tested for its saveall activity according to the test procedure described above. In this case, at a dosage of 3.25 p.p.m., the terpolymer exhibited a Phototester No. of 34 compared to the blank run in which a 58 Phototester unit number was realized. The terpolymeric chemical additive in this case was considered an excellent adjuvant in assisting flotation separation of fiber fines and filler from a typical paper mill white water. It can readily be seen, therefore, that the amounts of each monomer comprising the terpolymers of the invention should be maintained within the discovered ranges. Terpolymers having a monomer content without such disclosed ranges are decidedly inferior products in terms of their saveall activity.

As mentioned in the initial discussion of the problems of achievement of a useful flotation aid, oftentimes a chemical disclosed as a useful coagulant or settling aid is virtually inactive as a flotation additive. As just one example in support of this contention a typical compound of U.S. Patent 2,980,609 was prepared and tested for flotation activity. This product is said to exhibit activity as a settling or clarification aid in a typical coagulation process. More specifically, instructions of Example VII of this patent were followed to prepare the compound therein described. This compound, in turn, was evaluated via the flotation test described above. In this instance, the blank exhibited a Phototester value of 63 and the patent reference polymer at a dosage of 1.6 pounds per ton had a Phototester value of 56. Thus, it can be readily seen that a chemical disclosed as useful in one water treatment process such as coagulation, in many instances is virtually completely inactive in other water additive roles such as a saveall flotation aid. In other runs using higher or lower dosages of the patent polymer, no increase in saveall efficiency was noted, and a graph of dosage versus Phototester value gave virtually a straight line relationship.

The above examples clearly indicate some of the more important benefits derived by practices of the invention. In addition, the terpolymer additives increased throughput and the flotation rate, that is, the time required to produce a fibrous mass on the top of the unit, was substantially improved. Another advantage that accrued through use of the terpolymeric compositions was that the amount of suspended solids contained in the clarified white water had been dramatically diminished. Not only were these important benefits achieved, but it is also important to remember there was a materially improved solids blanket at the top of the saveall unit.

Due to the small dosage of the chemical required to effectively improve the operational characteristics of the saveall, it was not necessary to further treat the suspended solids removed from the system before they were recycled into the paper-making operation. It was also observed that white water which was relatively high in dissolved solids did not have a material effect upon the capability of the terpolymer to increase the flotation and removal rate of the suspended solids.

It is believed that the chemicals used in the process of the invention are capable of attaching the fibrous and other suspended matter in the white water to the air bubbles used in the flotation type saveall systems, thereby, substantially increasing their rapid removal from the white water to the surface of the suspension where they may be readily removed in a more compact and uniform form. An important concept of the invention also resides in the fact that the terpolymers used are not substantially affected by either the pH of the system or the particular charge upon the suspended particles contained in the white water systems, thereby permitting their use in a large variety of white water systems.

One of the most startling features of the invention resides in the extremely low dosages at which the terpolymers tend to substantially improve saveall operations. This is particularly true in the case of flotation type saveall systems in which the terpolymers of the invention have shown their most startling and beneficial results. As a general rule, the white water may be treated with the polymers using as little as 0.01 p.p.m. to as much as 200 p.p.m., with a general dosage range for most white waters being in the range of from between 0.1 p.p.m. up to 50 p.p.m. 0.5-5.0 p.p.m. will give best results in most instances. The terpolymeric chemicals are preferably added to the white water just prior to its being processed either by a flotation or vacuum type operation.

It will be understood that the parts per million dosage ranges thus specified are in terms of the entire white water system rather than based upon the solids content of the white water system.

Terpolymers have been above described as comprising in chemical combination, polyacrylamide, a polymerized polycarboxylic acid and a polymerized ethylenically unsaturated monomer. As thus used, this terminology is to be understood as referred to the polymeric chemical combination resulting from polymerization of the respective corresponding monomers in the presence of each other to yield a single terpolymeric compound, rather than a mixture of three separately polymerized monomers.

The invention is hereby claimed as follows:

1. A method of improving the operational efficiency of vacuum and flotation type white water recovery systems which comprises the step of treating said white water with at least an efficiency improving dosage of at least 0.01 p.p.m. of an organic water-soluble terpolymer formed as the reaction product of 85.0-95.0 parts by weight of acrylamide, 0.3-2.0 parts by weight of a polymerizable polycarboxylic acid selected from the group consisting of maleic acid, maleic anhydride and fumaric acid and 3-15 parts by weight of an ethylenically unsaturated water-soluble monomer differing from the above monomers.

2. The method of claim 1 wherein the white water recovery system is a flotation type system.

3. The method of claim 1 wherein the dosage of said terpolymer is at least 0.1 p.p.m. based on the white paper influent.

4. The method of claim 1 wherein the dosage of said terpolymer ranges from 0.1 p.p.m. to 200 p.p.m. based on the white water influent.

5. The method of improving the operational efficiency of vacuum and flotation type white water recovery systems whereby increased amounts of fibers and solids materials are collected and removed from the white water, which comprises the step of treating the white water with at least 0.1 p.p.m. based on total white water influent, of an organic water-soluble terpolymer formed as a reaction product of 89.5-94.5 parts by weight of acrylamide, 0.5-1.5 parts by weight of a polymerizable polycarboxylic acid monomer selected from the group consisting of a maleic acid, maleic anhydride, and fumaric acid, and 5-9 parts by weight of an ethylenically unsaturated water-soluble monomer differing from the above monomers.

6. The method of claim 5 wherein said white water is treated with 0.5-50 p.p.m. of said terpolymer based on the total white water influent.

References Cited by the Examiner

UNITED STATES PATENTS 2,980,609  4/1961  House et al. _____ 162—190
3,019,157  1/1962  Reynolds et al. _____ 162—168

OTHER REFERENCES

Stephenson, "Pulp and Paper Manufacture," vol. 3, 1953, McGraw-Hill Book Co., Inc., New York, page 35.

DONALL H. SYLVESTER, *Primary Examiner.*

S. L. BASHORE, *Assistant Examiner.*